Dec. 25, 1928.
E. S. WHITTIER
DEVICE FOR MELTING PARAFFIN
Filed May 10, 1926
1,696,826
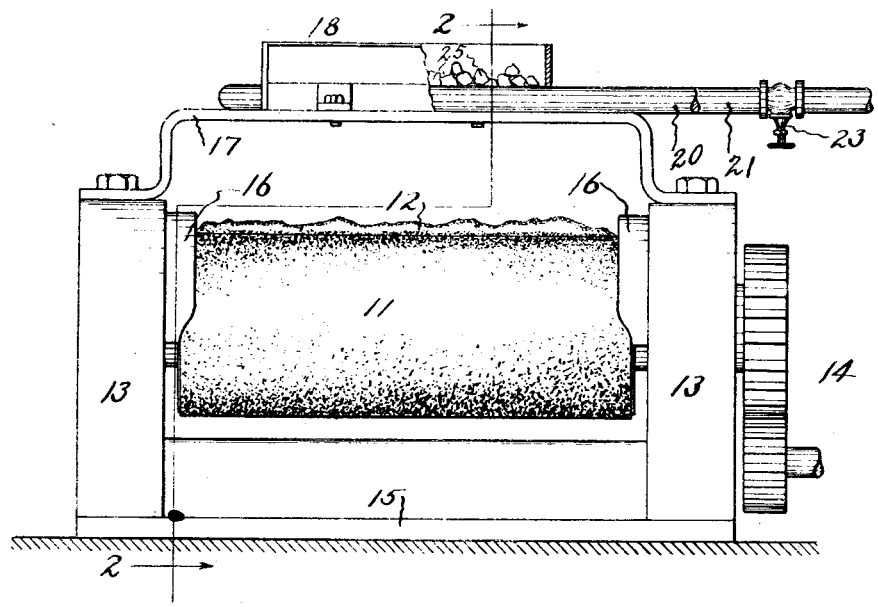
Fig. 1.
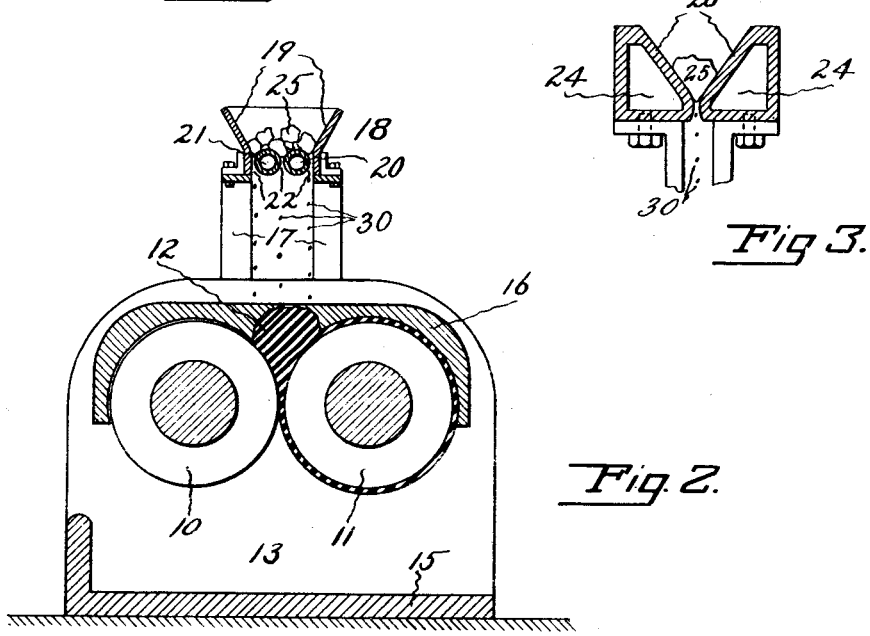
Fig. 2.
Fig. 3.
INVENTOR.
Elmer S. Whittier
BY
Edward C. Taylor
ATTORNEY.

Patented Dec. 25, 1928.

1,696,826

UNITED STATES PATENT OFFICE.

ELMER S. WHITTIER, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

DEVICE FOR MELTING PARAFFIN.

Application filed May 10, 1926. Serial No. 108,038.

One method of mixing paraffin or other liquefiable substances with the ingredients of a rubber compound has been by feeding large lumps of paraffin into the bite of the mixing rolls of a mixing mill as the ingredients are being mixed by the mixing mill. As the rolls rotate the lumps of paraffin are drawn into the bite of the rolls by the action of the rolls and the rubber and broken into smaller pieces which are apt to fly in all directions. It often results in the workman being struck and injured by some of the flying pieces of paraffin as well as scattering the paraffin on the floor. This means that some of the paraffin will not be picked up and returned to the rubber compound and therefore the compound will not have the proper amount of paraffin needed. Another method of mixing paraffin with rubber compounds has been to cut the paraffin into small pieces or chips. Still another method of mixing paraffin or other liquefiable substances with rubber compounds has been to melt the paraffin and pour it over the ingredients of the rubber compound, as the ingredients are being mixed by the mixing machine. The apparatus used to melt the paraffin is generally located in another room or at a distance from the mixing machine.

One of the objections to the latter method is the possibility of leaving the paraffin out of the rubber mixture through the forgetfulness or carelessness of the workman operating the mixing machine. The chief objection to this method of mixing has been that the paraffin is often mixed with the ingredients of the rubber compound before the paraffin has been entirely liquefied. The above methods result in unmelted or partly melted lumps of paraffin being incorporated in the rubber compound, and as the lumps do not completely melt or liquefy until they have been incorporated in the mixture there will be an uneven distribution of paraffin in the rubber.

It is, therefore, one of the objects of this invention to provide an apparatus for melting and gradually mixing paraffin, or a similar material at the mixing mill, or machine used in the mixing of rubber compounds. Another object is to provide a self-feeding device for melting or liquefying the paraffin. Another object is to provide a device whereby the rate at which the liquefying of the paraffin can be controlled. A further object is to provide an apparatus for melting paraffin which insures the liquefying of all the paraffin before it is mixed with the other materials of the mixture.

I attain these objects by the mechanism illustrated in the accompanying drawing, in which:—

Fig. 1 is a front elevation with certain parts shown in section;

Fig. 2 is an end elevation taken on line 2—2 of Fig. 1; and

Fig. 3 is a modification of certain parts shown in section in Fig. 2.

Referring to Figs. 1 and 2 the oppositely rotated feed rolls 10 and 11, between which the ingredients 12 are passed, are suitable mounted on standards 13 and driven by gearing 14. The standards 13 are mounted on the bed plate 15 and secured to each standard are fenders 16 riding on the upper surface of the rolls and extending down into the height of the rolls to form a hopper into which the ingredients 12 are placed. The ingredients 12 pass between the feed rolls 10 and 11 and are carried around feed roll 11 and delivered back into the hopper. Any particles that fall to the bed plate 15 are brushed up and returned to the hopper.

A frame 17 supporting a hopper 18 containing lumps of paraffin 25 is mounted on the standards 13 located above the mixing rolls 10 and 11. The sides 19 of the hopper 18 slant in towards the bottom of the hopper, which consists of parallel pipes 20 and 21 in spaced relationship with the sides of the hopper and also with themselves. The spacing is such that only the molten paraffin can pass through the spaces 22. Located in the supply line 2 is a valve 23.

A modified construction of the hopper 18 is shown in Fig. 3 with only one opening through which the melted paraffin can pass, and it is provided with slanting sides 26 that are heated by means of the heating chamber 24.

The operation of the apparatus for liquefying the paraffin is as follows: The ingredients 12 with the exception of the paraffin are placed on the rolls 10 and 11 and allowed to partially mix before the paraffin 25 is placed in the hopper 18. By opening the valve 23, the heating medium is admitted to the pipes 20 and 21. The rate at which the paraffin melts can be regulated by the amount or temperature of the heating medium that is allowed to flow through the valve. Fig. 3 shows a modification of a hopper made with heating chambers 24 through which the heating medium circulates to heat the hopper. If desirable, an electrically heated hopper may be used. As fast as the paraffin 25 is melted by the pipes 20 and 21, the melted paraffin will collect in drops 30 at the bottom of the pipes, and from there fall onto the ingredients 12 that are being mixed by the mixing rolls 10 and 11. The spaces between the pipes 20 and 21 and between the pipes and the sides 19 of the hopper are such that only liquefied paraffin can pass through these spaces, thus preventing any lumps of paraffin from being incorporated in the rubber compound.

Having thus described my invention, I claim:

1. In a machine for mixing plastics, the combination with the rolls thereof, of a hopper located above the rolls, steam pipes located at the bottom of the hopper, said pipes being arranged with a space between the pipes, and spaces between the pipes and the sides of the hopper, said pipes being spaced to permit a liquefied material to pass through said spaces.

2. A device for delivering liquefiable material to a rubber mixing mill comprising a hopper the bottom walls of which are formed by steam heated pipes spaced apart to form a material delivering slit.

ELMER S. WHITTIER.